(12) United States Patent
Stroh

(10) Patent No.: US 12,254,518 B1
(45) Date of Patent: Mar. 18, 2025

(54) REAL-TIME INDIVIDUALIZED ACTION PLAN FOR CLIENTS OF A FINANCIAL ASSISTANCE SERVICE

(71) Applicant: FREEDOM FINANCIAL NETWORK, LLC, San Mateo, CA (US)

(72) Inventor: Bradford Stroh, San Mateo, CA (US)

(73) Assignee: Freedom Financial Network LLC, San Mateo, CA (US)

( * ) Notice: Subject to any disclaimer, the term of this patent is extended or adjusted under 35 U.S.C. 154(b) by 0 days.

(21) Appl. No.: 17/736,837

(22) Filed: May 4, 2022

Related U.S. Application Data

(60) Provisional application No. 63/184,068, filed on May 4, 2021, provisional application No. 63/184,057, filed on May 4, 2021.

(51) Int. Cl.
*G06Q 40/12* (2023.01)

(52) U.S. Cl.
CPC ................... *G06Q 40/12* (2013.12)

(58) Field of Classification Search
None
See application file for complete search history.

(56) References Cited

U.S. PATENT DOCUMENTS

| | | |
|---|---|---|
| 6,456,983 B1 | 9/2002 | Keyes |
| 7,165,044 B1 * | 1/2007 | Chaffee ............... G06Q 40/06 |
| | | 705/37 |
| 7,860,781 B1 | 12/2010 | Bodi |
| 8,204,809 B1 | 6/2012 | Wise |
| 8,694,430 B2 | 4/2014 | Kobayashi |
| 8,719,132 B1 | 5/2014 | Diggdon |
| 9,552,610 B1 | 1/2017 | Tewell |
| 10,069,972 B1 | 9/2018 | Molander |
| 10,163,156 B1 | 12/2018 | Shapley |
| 10,169,784 B1 | 1/2019 | Hildebrand |
| 10,242,402 B1 | 3/2019 | Soccorsy |
| 10,460,379 B1 | 10/2019 | Diggdon |

(Continued)

FOREIGN PATENT DOCUMENTS

| | | |
|---|---|---|
| WO | WO-2001/059671 A2 | 8/2001 |
| WO | WO-0157756 A1 | 8/2001 |

(Continued)

OTHER PUBLICATIONS

Authors: B. Landfeldt et al.: User Service Assistant: an end-to-end reactive QoS architecture; Date of Conference: May 18-20, 1998 Date Added to IEEE Xplore: Aug. 6, 2002 (Year: 2002).

(Continued)

*Primary Examiner* — Fateh M Obaid
(74) *Attorney, Agent, or Firm* — Mahamedi IP Law LLP

(57) ABSTRACT

A computing system can receive client data and financial updates to generate personalized balance sheets and individualized action plans for clients of a financial assistance service. The system can link to data sources to detect changes in real-time to each client's financial situation, such as purchase information, received income, and payments. In response to each change, the computing system can update the balance sheet and action plan to facilitate the client in achieving milestones toward a set of overall goals.

20 Claims, 7 Drawing Sheets

(56) References Cited

U.S. PATENT DOCUMENTS

| | | |
|---|---|---|
| 10,672,076 B2 | 6/2020 | Pillai |
| 10,825,028 B1 | 11/2020 | Kramme |
| 10,891,037 B1 | 1/2021 | Mackrell |
| 11,087,412 B1 | 8/2021 | Ho |
| 11,176,461 B1 | 11/2021 | Merritt |
| 11,227,335 B2 | 1/2022 | Hayden |
| 11,249,985 B2 | 2/2022 | Wu |
| 11,270,375 B1 | 3/2022 | Jennings |
| 11,509,771 B1 | 11/2022 | Ross |
| 11,551,293 B1 | 1/2023 | Soccorsy |
| 11,615,077 B1 | 3/2023 | Sroka |
| 11,790,268 B1 | 10/2023 | Wick |
| 11,853,982 B1 | 12/2023 | Woodward |
| 12,002,087 B1 | 5/2024 | McCormick |
| 2002/0046049 A1 | 4/2002 | Siegel |
| 2002/0138409 A1 | 9/2002 | Bass |
| 2003/0105688 A1 | 6/2003 | Brown |
| 2003/0229560 A1* | 12/2003 | Bourassa ............... G06Q 40/06 705/36 R |
| 2004/0019560 A1 | 1/2004 | Evans |
| 2004/0243508 A1 | 12/2004 | Samson |
| 2005/0075914 A1* | 4/2005 | Bayne ................. G06Q 10/06 700/96 |
| 2005/0256735 A1* | 11/2005 | Bayne ............... G06Q 10/0639 705/7.11 |
| 2006/0010057 A1* | 1/2006 | Bradway .............. G06Q 40/00 705/35 |
| 2006/0080197 A1 | 4/2006 | Chi |
| 2006/0293983 A1 | 12/2006 | Rosenblatt |
| 2008/0147521 A1* | 6/2008 | Weaver .................. G06Q 40/02 705/40 |
| 2009/0006226 A1 | 1/2009 | Crowder |
| 2009/0048957 A1 | 2/2009 | Celano |
| 2009/0125375 A1 | 5/2009 | Bateni |
| 2009/0276368 A1 | 11/2009 | Martin |
| 2010/0111287 A1 | 5/2010 | Xie |
| 2010/0217706 A1 | 8/2010 | Griffin |
| 2011/0161155 A1 | 6/2011 | Wilhelm |
| 2011/0178922 A1 | 7/2011 | Imrey |
| 2011/0251978 A1 | 10/2011 | Davies |
| 2012/0066106 A1* | 3/2012 | Papadimitriou ....... G06Q 40/02 705/35 |
| 2012/0246048 A1 | 9/2012 | Cohen |
| 2013/0054435 A1 | 2/2013 | Zhang |
| 2013/0085936 A1 | 4/2013 | Law |
| 2013/0179338 A1 | 7/2013 | Evans |
| 2013/0290165 A1 | 10/2013 | Cerise |
| 2014/0310151 A1 | 10/2014 | Shishkov |
| 2014/0316810 A1 | 10/2014 | Olive |
| 2014/0365350 A1 | 12/2014 | Shvarts |
| 2014/0365353 A1 | 12/2014 | Shvarts |
| 2015/0039388 A1 | 2/2015 | Rajaraman |
| 2015/0046214 A1 | 2/2015 | Jain |
| 2015/0379488 A1 | 12/2015 | Ruff |
| 2016/0110813 A1 | 4/2016 | Hayden |
| 2016/0232546 A1 | 8/2016 | Ranft |
| 2016/0275608 A1 | 9/2016 | Dintenfass |
| 2016/0275610 A1 | 9/2016 | Dintenfass |
| 2016/0307272 A1 | 10/2016 | Thalker |
| 2017/0013131 A1 | 1/2017 | Craib |
| 2017/0262821 A1 | 9/2017 | Imrey |
| 2018/0012300 A1 | 1/2018 | Imrey |
| 2018/0082372 A1 | 3/2018 | Diana |
| 2018/0096319 A1 | 4/2018 | Aggarwal |
| 2018/0096386 A1 | 4/2018 | Aggarwal |
| 2018/0181903 A1* | 6/2018 | Kojima ............... G06Q 10/083 |
| 2019/0034951 A1 | 1/2019 | Cole |
| 2019/0130016 A1 | 5/2019 | Jennings |
| 2019/0236461 A1 | 8/2019 | Wong |
| 2019/0351766 A1 | 11/2019 | Spivak |
| 2019/0378207 A1 | 12/2019 | Dibner-Dunlap |
| 2020/0074539 A1 | 3/2020 | Palaghita |
| 2020/0074540 A1 | 3/2020 | Wolfe |
| 2020/0104843 A1 | 4/2020 | Bhasin |
| 2020/0104935 A1 | 4/2020 | Schmitt |
| 2020/0111159 A1 | 4/2020 | Sambhar |
| 2020/0151697 A1 | 5/2020 | Pinto |
| 2020/0257680 A1 | 8/2020 | Danyi |
| 2020/0334685 A1 | 10/2020 | Yan |
| 2020/0351403 A1 | 11/2020 | George |
| 2020/0394159 A1 | 12/2020 | Hurley |
| 2020/0402625 A1 | 12/2020 | Aravamudan |
| 2020/0410583 A1 | 12/2020 | Hart |
| 2021/0073909 A1 | 3/2021 | Le Roux |
| 2021/0081271 A1 | 3/2021 | Doshi |
| 2021/0124576 A1 | 4/2021 | Gungabeesoon |
| 2021/0133670 A1 | 5/2021 | Cella |
| 2021/0142384 A1 | 5/2021 | Nori |
| 2021/0201359 A1 | 7/2021 | Sekar |
| 2021/0201394 A1 | 7/2021 | Lemanski |
| 2021/0256084 A1 | 8/2021 | Marsh |
| 2022/0076834 A1 | 3/2022 | Hanlon |
| 2022/0101383 A1 | 3/2022 | Bloom |
| 2022/0138280 A1* | 5/2022 | Riggs ............... G06F 16/24578 707/737 |
| 2022/0255969 A1 | 8/2022 | Cage |
| 2022/0345543 A1 | 10/2022 | Oleinikov |
| 2022/0406463 A1 | 12/2022 | Hanlon |
| 2023/0070467 A1* | 3/2023 | Lim .................. G06Q 40/08 |
| 2023/0075411 A1* | 3/2023 | Jeph .................. G06Q 40/06 |
| 2023/0125183 A1 | 4/2023 | Olesen |
| 2023/0127675 A1 | 4/2023 | Olesen |
| 2023/0128256 A1 | 4/2023 | Olesen |
| 2023/0162191 A1* | 5/2023 | Valencia ............. G06Q 20/389 705/69 |
| 2023/0325840 A1 | 10/2023 | Visegrady |
| 2023/0342761 A1 | 10/2023 | Zhang |
| 2024/0112157 A1 | 4/2024 | Sun |

FOREIGN PATENT DOCUMENTS

| | | |
|---|---|---|
| WO | WO-2003/048996 A1 | 6/2003 |
| WO | 2005096204 | 10/2005 |
| WO | WO-2018033934 A1 * | 2/2018 |

OTHER PUBLICATIONS

Authors: Xin Bai et al.: Coordination in Intelligent Grid Environments; Published in: Proceedings of the IEEE ( vol. 93, Issue: Mar. 3, 2005) pp. 613-630; Date of Publication: Feb. 28, 2005 (Year: 2005).

"How to Read your Escrow Statement", found online at https://www.spservicing.com/Content/pdf/HowToReadStatement_BKEscrowStatement.pdf (Year: 2017).

12 CFR 1024.17 (Year: 2017).

* cited by examiner

| Personal Balance Sheet ||
|---|---|
| Assets | Liabilities |
| Cash | Secured Loans |
| Savings Account | Home Loan |
| Checking Account | Auto Loan |
| CDs | Unsecured Loans |
| Other Cash | Student Loan |
| Investments | Personal Loan |
| Real Estate | Credit Card 1 |
| Stock Equity | Credit Card 2 |
| Other | Other Loans |
| Other Assets | Total Liabilities |
| Jewelry | Net Worth |
| Other | Assets |
| Total Assets | Liabilities |
| | Assets - Liabilities |

*FIG. 3A*

REAL-TIME INDIVIDUALIZED ACTION PLAN FOR CLIENTS OF A FINANCIAL ASSISTANCE SERVICE

RELATED APPLICATIONS

This application claims benefit of priority to Provisional U.S. Patent Application No. 63/184,057, filed May 4, 2021; and to Provisional U.S. Patent Application No. 63/184,068, filed May 4, 2021; both of the aforementioned priority applications being hereby incorporated by reference in their respective entireties.

BACKGROUND

Individuals that experience relatively large changes in their financial situation (e.g., receive a windfall) or those who are struggling to manage their personal finances generally benefit from seeking guidance through a financial advisor, who is typically skilled in assessing personal financial information and devising individualized financial strategies for saving, investing, making large purchases, budgeting, and paying off debt. However, these advisors may charge large fees and are only available periodically throughout the year through scheduled meetings.

BRIEF DESCRIPTION OF THE DRAWINGS

The disclosure herein is illustrated by way of example, and not by way of limitation, in the figures of the accompanying drawings in which like reference numerals refer to similar elements, and in which:

FIGS. 3A and 3B are examples of a personal balance sheet and individualized action plan for a client of the financial assistance service, according to various examples;

DETAILED DESCRIPTION

Figure 1:
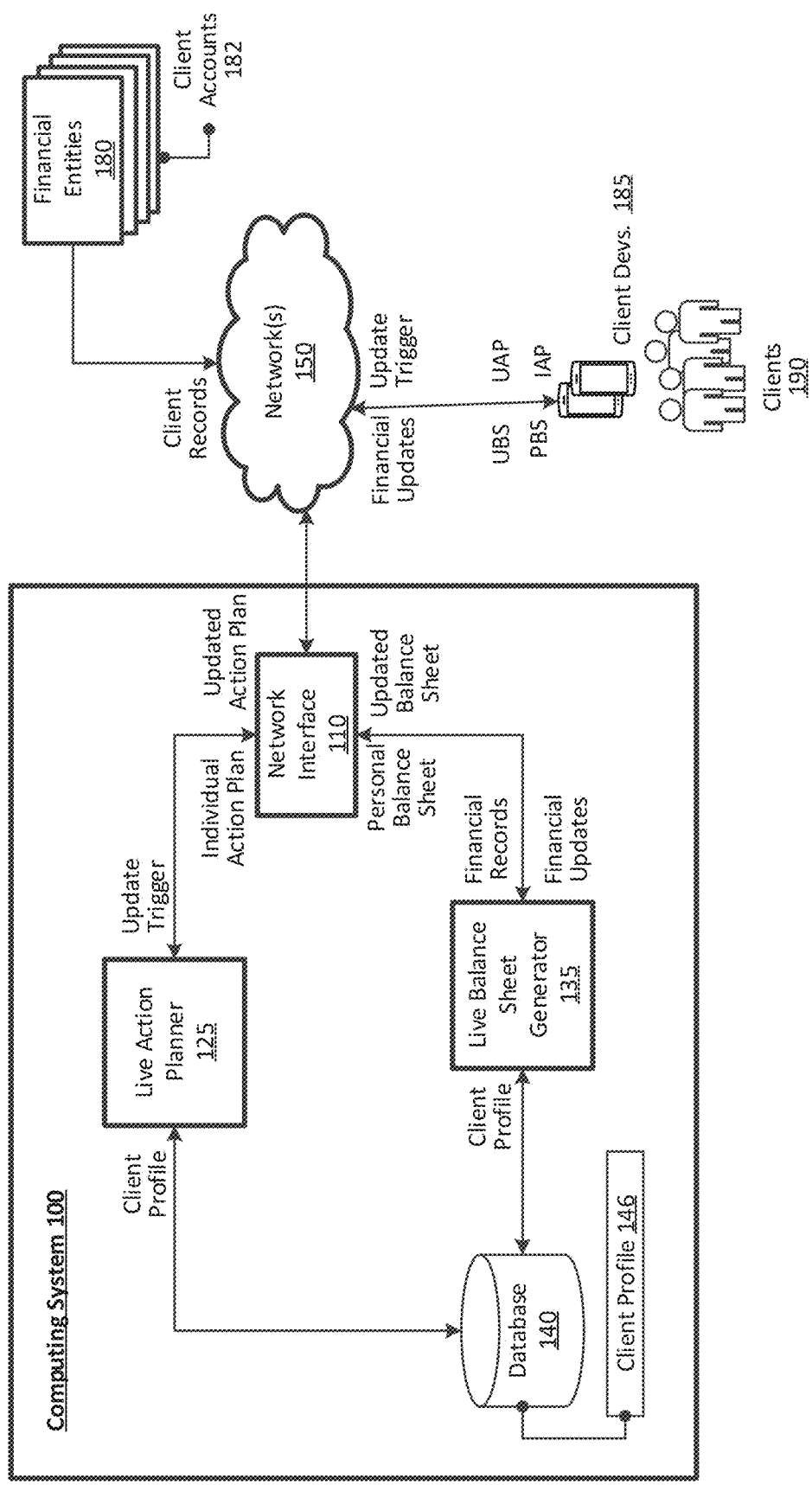
FIG. 1 is a block diagram illustrating a computing system for generating a real-time individualized action plan for clients of a financial assistance service, according to examples described herein.

According to various examples, a computing system can initiate network communications with client devices to generate a personal balance sheet for each client based on the client's personal information. In certain examples, the personal balance sheet can be conceptually and structurally similar to a corporate balance sheet and can comprise a snapshot of the client's overall financial condition. Accordingly, the computing system can access the client's data from multiple data sources, such as banks, lending providers, inputs from the client, etc., to provide the client with a summary of the information in one unified view. This is distinct from the current technology in the field of financial organization, which attempt to aid their customers by focusing on one element of their finances (e.g., credit card repayment). The computing system described herein provides a global overview of the personal financial condition of a client, and then dynamically executes summary logic on the client's real-time personal data to generate and continuously update a customized balance sheet and plan of action for the client.

According to examples described herein, the computing system can further execute optimization logic using the client's personal data to create a real-time individualized budget for the client, facilitate in managing and/or paying down debt, assist the client with monthly spending, and generally create an action plan for the client to follow. In previous methods, the client's computing devices execute one or more applications to assist the client with saving, investing, finding a credit card, managing the client's credit score, and the like, to assist the clients with a very specific aspect of their respective financial situations. The computing system described herein can extend such assistance tools by providing clients with a more complete view of their personal financial situation, which allows the computing system to capture a full view of the client's information, make inferences based on this full view, and generate a personalized plan of action for the client to maintain or improve the client's financial situation.

Furthermore, the generated plan of action can flag certain aspects of the user's personal situation, such as whether the client has adequate savings to weather an emergency, whether the client owns a home, whether the client has one or more liabilities with a relatively high interest rate (e.g., an auto loan), whether the user has significant unsecured credit debt, and/or whether the client could qualify for a personal loan based on a risk score for the client. In various examples, the plan of action can comprise unique set of steps based on a prioritization scheme specific to the client. As such, the system can receive client data and financial updates of the client to generate personalized balance sheets and individualized action plans for the clients of the financial assistance service. In doing so, the system can link to data sources to detect changes in real-time to each client's financial situation, such as purchase information, received income, and payments. In response to each change, the computing system can update the balance sheet and action plan to facilitate the client in achieving milestones toward a set of overall goals.

In one example, a home-owning client struggling with personal debt and low income may be provided with an action plan that prioritizes the payment of credit card debt through a home-equity line of credit (HELOC) (e.g., to refinance the credit card debt with a lower rate). A second priority of the action plan for this client may be to reduce monthly bills (e.g., refinancing an auto loan, budgeting food and entertainment spending, etc.), and then create an emergency fund (e.g., via a savings app). A final step of the action plan may be to improve a credit score and/or build credit for the client. For each prioritized step of the action plan, the computing system can link the client to one or more resources that further aid the client with respect to that particular step, such as helping the client structure and de-mystify personal finances.

In further examples, the computing system can create an engagement loop for the client to facilitate with continuous and/or repeated engagement with the client's personalized action plan. In one aspect, the engagement loop can provide a messaging or communication application to communicate with a human or computerized advisor, analyze current financial information, weigh each aspect of the client's assets and liabilities, and recommend a personalized and sequential set of supplementary actions based on the current situation of the client. In doing so, the computing system can factor in discrete elements of the client's balance sheet (e.g., the client's mortgage information) and direct the client to a relevant resource to aid with that discrete element or related elements (e.g., a HELOC provider to eliminate credit card debt of the client).

In still further examples, the computing system can provide a financial health score to each client based on the client's personal financial situation and/or progress using the individualized action plan. The financial health score can comprise a proprietary composite of the personal information provided to the computing system. Based on the changing financial situation of the client and/or the client's progress in following the individualized action plan, the computing system can generate an updated financial health score for the client. According to examples, the computing system can receive the financial data from the client's computing device dynamically and can execute the prioritization and planning models on the dynamic financial information in real time to update the personalized action plan for the client.

Examples described herein achieve a technical effect of implementing real-time, automated financial planning and advising services for clients using dynamic financial data received through network communications with the computing device of the client and/or financial entities associated with the client. A personal balance sheet is dynamically updated for the client based on access to the client's financial data, such as purchase information, account information, and the like. Furthermore, the computing system can update an individualized action plan for the client based on the dynamic data.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code, computer-executable instructions, algorithms, and/or computer models developed through software coding. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAS), laptop computers, virtual reality (VR) or augmented reality (AR) computers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the disclosure include processors and various forms of memory for holding data and instructions.

Examples of non-transitory computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating a computing system 100 for generating a real-time individualized action plan for clients of a financial assistance service, according to examples described herein. In various examples, the computing system 100 can include a network communication interface 110 to communicate, over one or more networks 150, with client computing devices 185 of clients of a financial assistance service implemented by the computing system 100. In certain examples, the network communication interface 110 can also facilitate network communications with financial entities 180 associated with the clients 190. For example, the financial entities 180 may comprise financial accounts 182 of the clients 190, which the network communication interface 110 can link to in order to gather each client's financial records 146 and organize the records 146 in a database 140. In further examples, the client computing devices 185 of the clients 190 can establish a network link with the communication interface 110 via execution of one or more dedicated applications that correspond to the financial assistance service implemented by the computing system 100.

In various implementations, the computing system 100 can comprise a live balance sheet generator 135 that can initially receive financial records from a client 190. In certain aspects, the financial records can be received from one or more financial entities 180 that include client accounts 182 of the client 190, such as bank accounts, credit card accounts, mortgage accounts, personal loan accounts, auto loan accounts, and the like. Additionally or alternatively, the financial records may be received from the client device 185 of the client 190, such as through an executing application that links the client device 185 with the various client accounts 182 of the client 190. Accordingly, the financial records of the client 190 can include all assets and liabilities of the client, including any personal property (e.g., jewelry, gold, memorabilia, vehicles, art assets, etc.), debt obligations (e.g., personal loans or debts to individuals, monthly financed service payments, mortgage payments, etc.), personal income (e.g., wages, received rents, and other income sources), rent and utility payments, monthly bills, and the like.

The live balance sheet generator 135 can process the financial records of the client 190 to create a record or profile 146 of the client 190 in a database 140 of the computing system 100, which the live balance sheet generator 135 can update when financial updates are received, such as information indicating purchases, debt payments, paychecks, etc. According to examples provided herein, the live balance sheet generator 135 can process the financial records of the client 190 to generate an initial personal balance sheet for the client 190. This personal balance sheet can provide the client 190 with a global view of all assets and liabilities from the various financial sources and accounts of the client 190. In certain implementations, the personal balance sheet be accessible on the client device 185 of the client 190 via an executing financial assistance application, described below with respect to FIG. 2.

In various examples, the financial assistance application on the client device 185 can run as a background application that links the client device 185 with the computing system 100 dynamically over the one or more networks 150. Accordingly, the live balance sheet generator 135 can dynamically receive financial updates from the client device 185 and/or the client accounts 182 of the client 190 continuously. As described, the financial updates can indicate purchases made by the client 190 (e.g., buying lunch), debt payments, received wages, etc. The live balance sheet generator 135 can execute summary logic to dynamically update the personal balance sheet of the client 190, which can be presented to the client 190 via the executing financial assistance application on the client device 185.

Thus, the updated balance sheet can be viewed by the client 190 on-demand and can reflect current information based on the client's 190 most recent financial occurrences. It is contemplated that this dynamically updated, live balance sheet will provide the client 190 with a continuous picture of current finances in order to enable the client 190 to precisely follow a crafted financial action plan that is custom-tailored for the client 190 by the computing system 100. It is further contemplated that each individual's finances may be wildly distinct from the finances of the individual's peers, and therefore the financial planning industry is composed of human experts that typically review the financial records of their clients and provide customized financial instruments for their clients, such as budgets, investment strategies, savings plans, debt repayment strategies, and the like. However, access to the services of these financial planners is typically expensive and limited to, at most, one or two appointments per year.

According to examples provided herein, the computing system 100 can include a live action planner 125 that provides a more granular financial action plan for the client 190 that can be updated dynamically as financial updates of the client 190 are received. Initially, the live action planner 125 can receive the financial records, described herein, of the client 190 to generate an individualized financial action plan for the client 190 to follow when steadying, improving upon, or maintaining financial health (e.g., repaying debt, managing payments, building credit, saving, budgeting, etc.). As described below, the individualized action plan can be accessed by the client 190 via an executing financial assistance application provided by the computing system 100.

In various examples, the live action planner 125 can execute optimization logic using the client's financial records and updates to dynamically generate a real-time individualized action plan for the client 190. As described in further detail below, the individualized action plan can facilitate the client 190 in generating an optimal budget based on the financial information of the client 190, facilitate in managing and/or paying down debt, assist the client 190 with monthly spending, improving the client's credit, aid the client in savings, and the like. Furthermore, the live action planner 125 can update the individualized action plan based on update triggers that indicate any changes in the client's 190 finances, such as receiving wages, making purchases, making payments, and the like. For example, the live action planner 125 can receive an update trigger indicating that the client 190 has received a paycheck. In response, the live action planner 125 can perform a lookup of the profile of 146 of the client 190, which can indicate a current action plan and balance sheet specific to the client 190.

Based on the update trigger indicating the change to the client's 190 financial situation, the live action planner 125 can update the individualized action plan for the client 190, flag or provide a warning for any potential upcoming problems (e.g., an inability to make a payment in full, closing in on or exceeding a budget threshold, missing a savings target, etc.), and show progress updates for each of any number of financial goals. In certain aspects, the individualized action plan can indicate periodic goals (e.g., monthly goals) for savings, payments, spending or budgeting, and the like. As each goal get closer to being achieved, a progress indicator can provide the client 190 with an incentive to achieve each periodic goal detailed by the individualized action plan.

In various implementations, the live action planner 125 can also generate overall goals for the client 190 based on the client's own personal goals, such as purchasing a home, eliminating debt, and/or building credit. Additionally or alternatively, the optimization logic executed by the live action planner 125 can process the financial records and updates of the client 190 to determine a set of financial health prioritizations for the client 190 that may be generalized to all clients 190. For example, the prioritizations can comprise a sequence or balance of priorities for the financial assistance clients 190, which can be generally composed of making necessary payments (e.g., bills, rents, mortgage payments, etc.), paying down debt (e.g., highest interest to lowest interest or highest balance to lowest balance, otherwise known as "avalanching" debt or "snowballing" debt respectively), building an emergency fund, creating a diversified investment portfolio, saving for a home down payment, saving for a child's education, and the like. Each overall milestone in the prioritizations can be directly connected to or associated with the periodic goals, such that achievements of the periodic goals have an add-on effect of contributing to the overall milestones and goals for the client 190.

As provided herein, the dynamically updated and individualized action plan for each client 190 provides a technical solution to current problems that exist in the field of personal finance. It is contemplated that a number of these problems are practical in nature. However, the current lack of a dynamically updated balance sheet and financial action plan individually tailored to each client 190 exemplifies the technical problem currently observed in the field of financial management. Specifically, while several savings, budgeting, and investing tools are available for individuals in the field of personal financial management, the technical field current lacks a dynamically updated, virtual, and personalized financial assistance tool for clients 190 seeking to improve, manage, and/or sustain their personal financial health.

In other words, it is contemplated that the combination of (i) a real-time balance sheet for tracking current personal financial assets and liabilities and (ii) a dynamically updated, individualized action plan for achieving periodic and overall financial milestones and goals through real-time network links with the clients' computing devices 185 and/or financial accounts 182 integrate the manual gathering of financial data and development of a financial plan into a practical application. The automation of balance sheet and action plan creation and their dynamically updated nature have only been made possible through improvements in network communications and computing technology (e.g., smartphone and application-based technical improvements). Accordingly, the current lack of such tools in the field of personal financial advising, planning, and management itself comprises a technical problem to which the present disclosure provides a technical solution.

Client Computing Device

Figure 2:
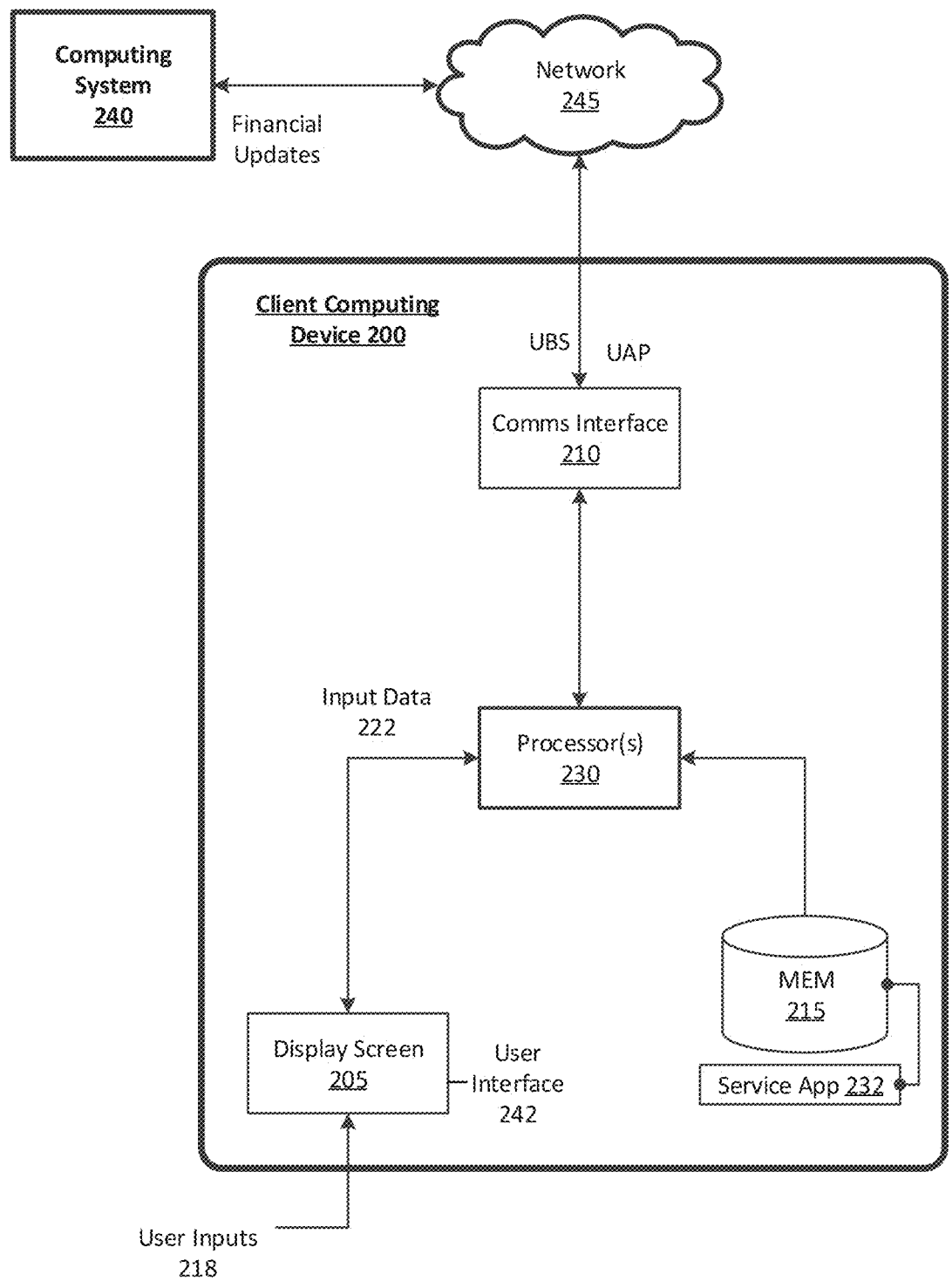
FIG. 2 is client computing device executing a financial assistance application, according to various examples.

FIG. 2 is client computing device 200 executing a financial assistance application 232, according to various examples. In many implementations, the computing device 200 can comprise a mobile computing device, such as a smartphone, tablet computer, laptop computer, VR or AR headset device, and the like. In variations, the computing device 200 can comprise a desktop personal computer typical of the office spaces of business entities, or a computer server of a backend server network. In some examples, the computing device 200 can include certain features such as a microphone, a camera, a positioning system, and a sensor system (e.g., IMU), such as those included in mobile computing devices. Additionally or alternatively, the computing device 200 can include a communication interface 210 to communicate with external entities using any type of wireless or wired communication protocol. In certain aspects, the computing device 200 can store a designated application (e.g., a financial assistance application 232) in a local memory 215 to enable a client to engage the service described in connection with FIG. 1.

In response to a user input 218 selecting the service application 232, the application 232 can be executed by one or more processors 230, which can cause a user interface 242 to be generated on a display screen 220 of the computing device 200. Furthermore, the executing application can enable the computing device 200 to communicate with the computing system 240 over one or more networks 245. As provided herein, the computing system 240 shown in FIG. 2 can correspond to the computing system 100 described in connection with FIG. 1.

The user interface 242 of the service application 232 can enable the client 190 to sign up for and engage with the financial assistance service implemented by the computing system 240. For example, a client 190 can launch the application 232 to generate an interactive user interface 242 on the display screen 205, which the client 190 can interact with to view a personalized balance sheet and a dynamically updated, individualized action plan, as described herein.

As further described herein, execution of the service application 232 can cause the computing device 200 to transmit financial updates to the computing system 240. In variations, the client 190 can input personal information (e.g., a username and password) for each linked account that is to be tracked by the computing system 240 for updating the personal balance sheet and individualized action plan for the client 190. For example, the links can provide the computing system 240 access to various accounts of the client 190 in order to receive financial updates of the client 190 in real time. Thereafter, the computing system 240 can link to the financial accounts of the client 190 directly. The updated balance sheet and updated action plan can be presented on the interactive user interface 242 as a customized tool for the client 190 in improving or sustaining a personal financial condition (e.g., like a virtualized personal financial assistant).

In some aspects, the interactive user interface 242 can provide the client 190 with a gamified approach to sustaining or improving personal financial health. As such, the personal balance sheet and individualized action plan can provide milestones and overall goals with progress indicators for each milestone and goal. It is contemplated that such an approach—being performed in real-time for the client 190—provides crucial incentives and personal motivation for typical users that are currently lacking in the technical field of personal financial management. Such gamified incentives are currently provided through physical health monitoring applications that measure health aspects of users, such as blood pressure, pulse rate, activity (e.g., distance traveled, steps taken, etc.), sleep quality, etc. to provide users contextual information regarding their personal health on a day-to-day basis. These physical health applications also provide progress or milestone indicators (e.g., color-coded scores or achievement bars and rings) that have been observed to effectively improve upon certain users' current health and activity habits. It is contemplated that the gamified financial health monitoring and progress indication methods described herein can have similar beneficial effects for certain clients 190 (e.g., those struggle with debt or wishing to save more).

Example Personal Balance Sheet

Figure 3B:
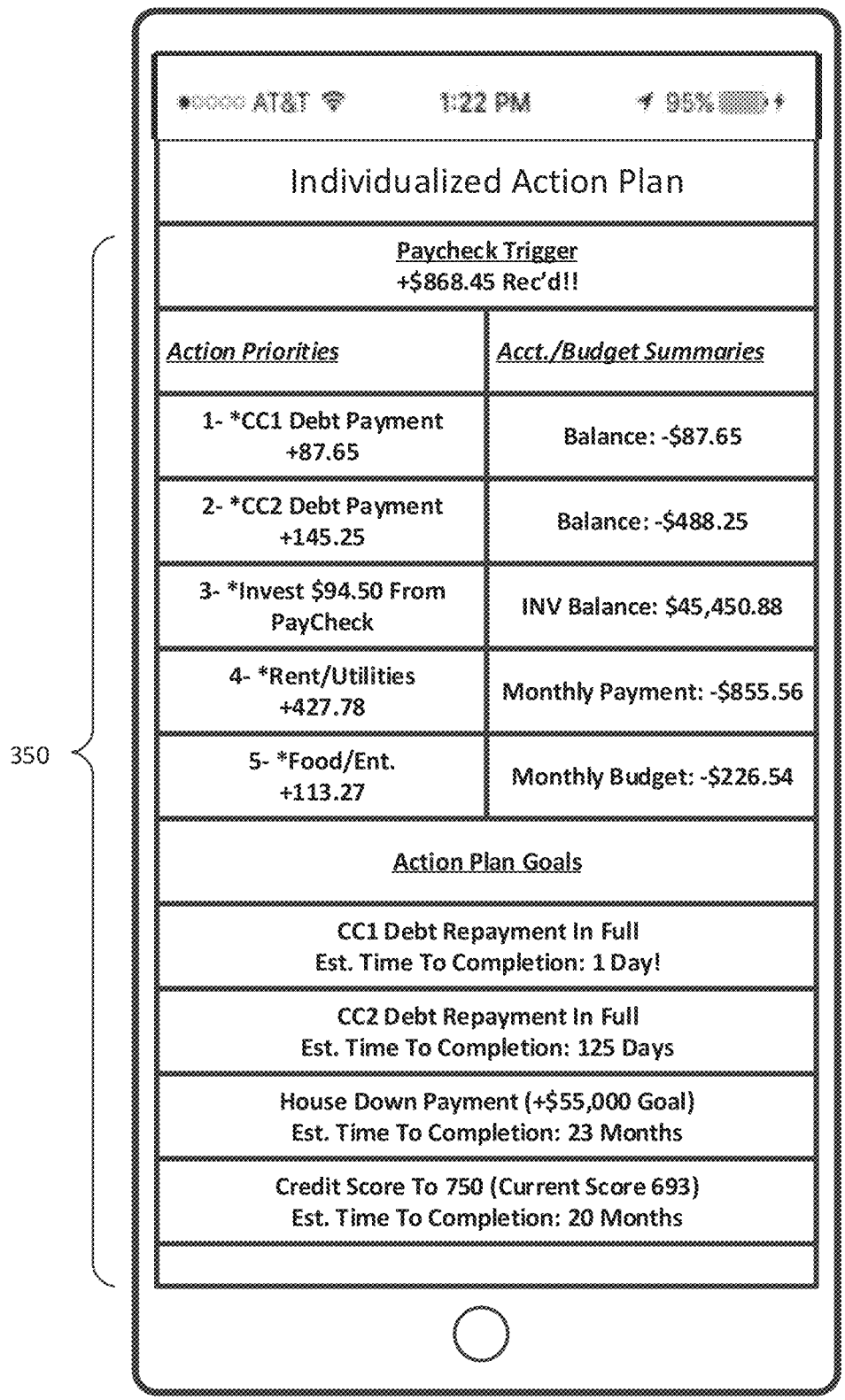

FIGS. 3A and 3B are examples of a personal balance sheet and individualized action plan for a client of the financial assistance service, according to various examples. It is contemplated that a variety of manners exist in which to label and present personal financial information, and certain information shown may not be shown in FIG. 3A that may be present in actual implementations. Accordingly, FIG. 3A is shown as a representative example, and further implementations of the present disclosure are not to be limited to the example shown in FIG. 3A. For example, the personal balance sheet as implemented may include a more detailed cash flow summary than that shown in FIG. 3A, and/or may be filterable and/or scrollable to show more targeted and detailed information based on the financial records and updates received from the client 190 or the financial entities 180 of the client 190.

Referring to FIG. 3A, the client 190 can access an interactive user interface 242 via the executing service application 232 to view a personal balance sheet 300 specific to the client 190. The personal balance sheet 300 can present different classes of assets and liabilities, update total balances (not shown), and display sum totals of liabilities, assets, and overall net worth of the client 190. Specifically, the personalized balance sheet 300 can provide a listing of asset account balances of the client, such as an amount the client 190 current owns in one or more cash accounts (e.g., savings, checking, CDs, money market funds, etc.), investment accounts, real estate accounts or current equity ownership in real estate, and/or estimated asset value in personal property. Additionally, the personalized balance sheet 300 can provide a listing of debt balances, including one or more home loan balances, auto loan balance(s), student loan balance(s), personal loan balance(s), credit card debt balance(s), and other forms of debt. As provided herein, the personal balance sheet 300 displayed on the user interface 242 can be updated based on update triggers, such as a spending trigger, a payment trigger, a paycheck trigger, a received dividend trigger, etc. Accordingly, in response to each instance of a change in the finances of the client 190, the personal balance sheet 300 can be updated by the computing system 100.

Example Dynamic Individualized Action Plan

FIG. 3B shows an example of an individualized action plan 350 for a client 190, according to certain examples. In one aspect, the client 190 can switch between the personal balance sheet 300 and the individualized action plan 350 via a selection feature on the interactive user interface 242, such as an icon, or perform a swipe gesture that scrolls horizontally between individual pages of the interactive user interface 242. In one example, the individualized action plan 350 can be for a home-owning client, and can prioritize the payment of credit card debt (e.g., through a HELOC) to refinance the credit card debt with a lower rate. In such an example, a second priority of the action plan 350 for this client 190 may be to reduce monthly bills (e.g., refinancing an auto loan, budgeting food and entertainment spending, etc.), and then create an emergency fund. A final step of the action plan 350 for this client 190 may be to improve a credit score and/or build credit. In some aspects, for each prioritized step of the action plan 350, the computing system 100 can link the client 190 to one or more resources that further aid the client 190 with respect to that particular step.

Referring to FIG. 3B, the individualized action plan 350 specific to a certain client 190 can indicate an update to the action plan 350 triggered by the client 190 receiving a paycheck. Based on the trigger, the action plan 350 can generate customized priority updates for deploying the received money. In the example shown, the action plan 350 provides the client 190 with detailed priorities specific to the received paycheck, such as paying off a credit card (first priority), paying down a second credit card (second priority), depositing a portion in a specific investment account (e.g., an ETF or index fund) (third priority), dedicating a portion of the paycheck to rent and utilities (fourth priority), and dedicating a portion to food and entertainment (fifth priority). The number of priorities can vary based on the nature of the trigger and can include various differing classes. The individualized action plan 350 can further present account and budget summaries, which can also be added to and updated as the client 190 makes further financial updates (e.g., pays bills, invests, saves, makes purchases, takes out loans, etc.).

In further examples, the individualized action plan 350 can provide notifications and progress reports in accordance with the financial updates of the client 190. In the example shown in FIG. 3B, the action plan 350 indicates overall action plan goals and a timeline in which those goals are to be completed if the client 190 is diligent in following the individualized action plan 350. As described herein, the client 190 can set personal goals, such as a home purchase at a particular price that requires a certain down payment. The computing system 100 can process such information through the execution of the optimization logic to generate this particular aspect of the individualized action plan 350. In the example shown in FIG. 3B, the system 100 has determined that the client 190 should save a particular amount for a down payment to purchase a home, and an indication of how much time is required to achieve this particular milestone.

Furthermore, the computing system 100 may further determine, as a background operation, that the client 190 will require a credit score of 750 to access the lowest mortgage rates when the time comes to purchase a home. Accordingly, the action plan 350 generated by the computing system 100 can also generate a credit score milestone to be achieved by a certain time prior to completion of the house down payment savings milestone, as shown in FIG. 3B. In addition, the individualized action plan 350 can provide the client 190 with low level actions, such as the paycheck triggered actions shown in FIG. 3B, that when performed by the client 195 and combined over time, can promote the completion of the overall action goals (e.g., achieving a particular credit score by a certain date).

Additional features of the individualized action plan 350 are also contemplated. For example, if the client 190 owns a home and is struggling to pay down high interest debt (e.g., credit card debt), the optimization logic executed by the live action planner 125 described in FIG. 1 can determine an optimal manner in which to refinance the high-interest debt, such as taking out a HELOC at a significantly lower interest rate to pay off the credit card debt balance outright. Upon determining such optimal actions for the client 190, the interactive user interface 242 displaying the individualized action plan 350 can further provide selectable links to third-party or internal services (e.g., causing a corresponding application on the client's computing device 185 to be launched) that enable the client 190 to readily undertake the process of completing the optimal action. In the example of a HELOC, the individualized action plan 350 can provide a selectable icon that, when selected, links the client 190 to one or multiple HELOC providers, showing offered rates based on the client's 190 current financial situation, which can be provided to the HELOC provider(s) automatically by the computing system 100.

Methodology

Figure 4A:
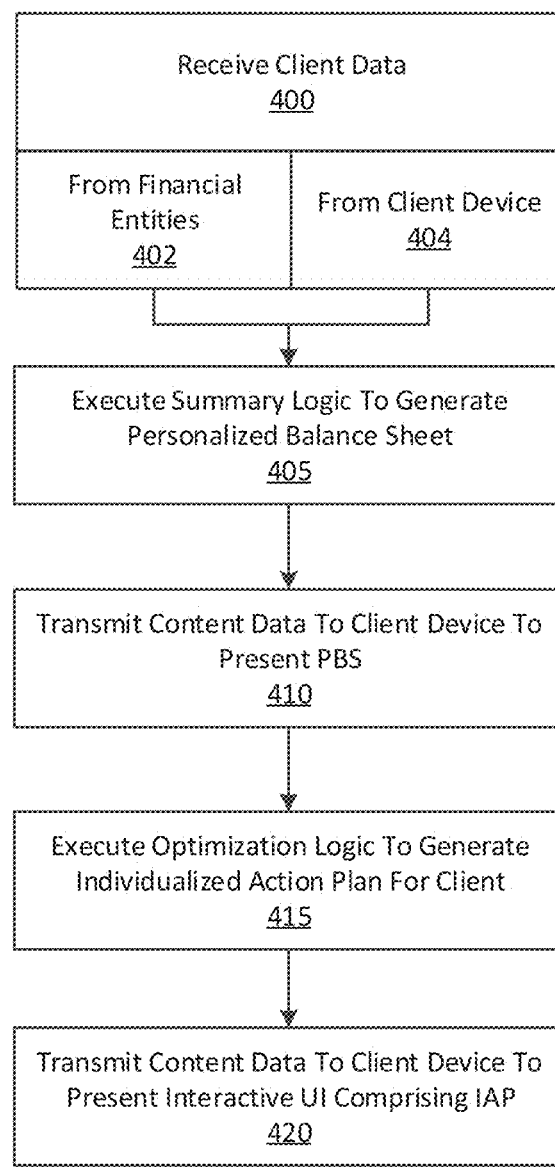
FIGS. 4A and 4B are flow charts describing example methods of individualized and real-time financial health prioritization and planning for clients of a financial assistance service, according to examples described herein.
Figure 4B:
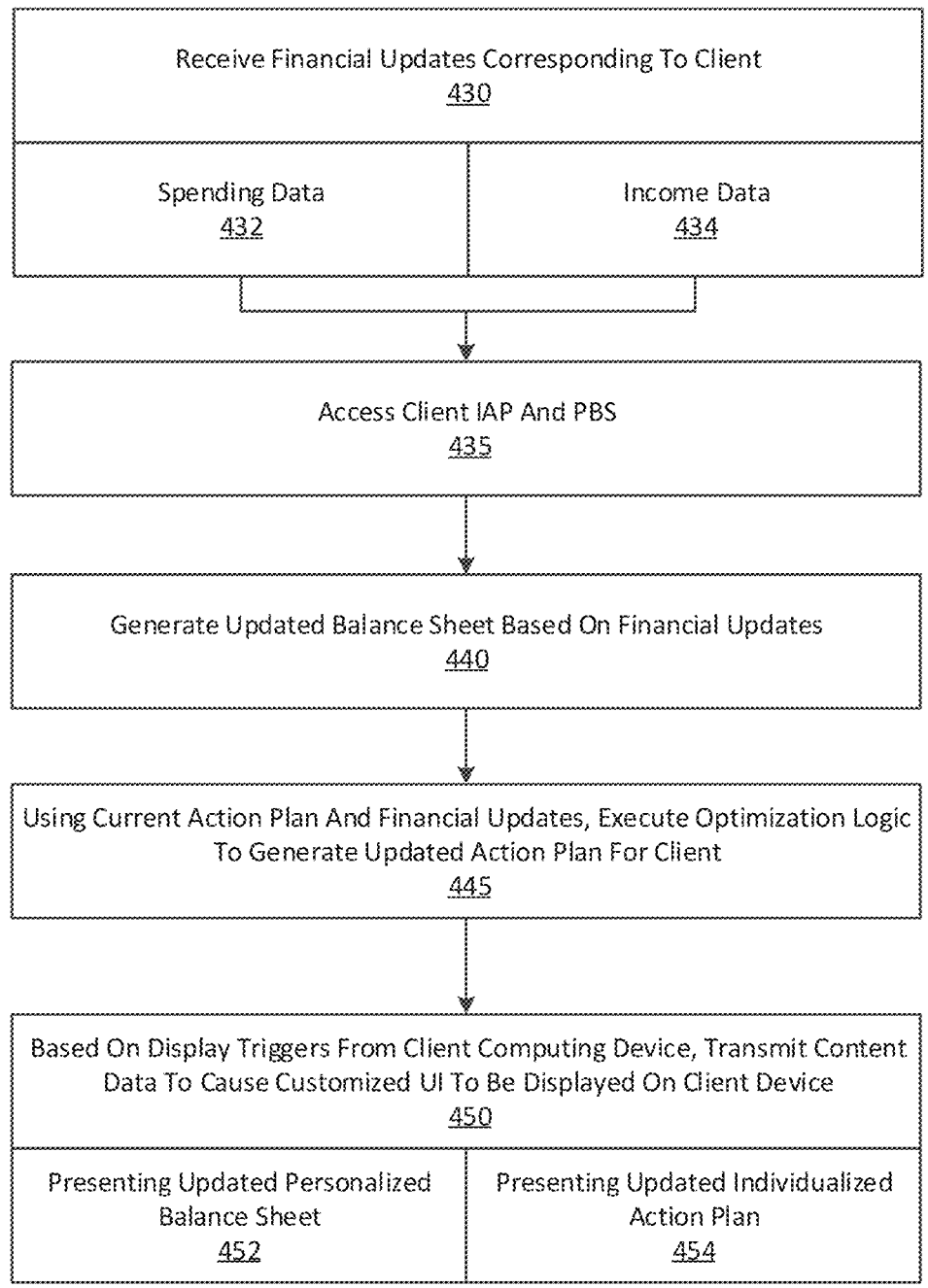

FIGS. 4A and 4B are flow charts describing example methods of individualized and real-time financial health prioritization and planning for clients of a financial assistance service, according to examples described herein. In the below descriptions of FIGS. 4A and 4B, reference may be made to reference characters representing like features as shown and described with respect to FIGS. 1, 2, 3A, and 3B. Furthermore, the processes described with respect to FIGS. 4A and 4B may be performed by a computing system 100, 240 as shown and described in connection with FIGS. 1 and 2. Referring to FIG. 4A, the computing system 100 can receive client data, such as personal information (e.g., age, location, address, name, etc.) and client financial data (e.g., account balances, mortgage information, debt information, asset and liability information, etc.) from one or more sources associated with the client 190 (400). For example, the client data can be received from financial entities 180 managing client accounts 182 of the client 190 (402). Additionally or alternatively, the client data can be received from the client's computing device 185 via a network link through an executing application 232 (404).

In various examples, the computing system 100 can execute summary logic using the client data to generate a personalized balance sheet 300 for the client 190 (405). The computing system 100 may then transmit content data to the client's computing device 185 to cause the computing device 185 to present the personalized balance sheet 300 for the client 190 (410). The computing system 100 can also execute optimization logic using the client data to generate an individualized action plan 350 that is customized specifically for the client 190 (415). Additionally, the computing system 100 can transmit content data to the client's computing device 185 to cause the computing device 185 to display an interactive user interface 242 that presents the individualized action plan 350 to the client 190 accordingly (420).

FIG. 4B describes the dynamic aspect of both the personalized balance sheet 300 and individualized action plan 350 through real-time network links with the client's computing device 185 (e.g., via the financial assistance service application 232) and/or with financial entities 180 to access account activity in the client's accounts 182. Referring to FIG. 4B, the computing system 100 can receive financial updates corresponding to the client 190 (430). In various examples, such updates can be received in real-time as the client 190 spends money and receives income. As such, the financial updates can comprise spending data (432) and income data (434) specific to the client 190. The spending data and income data can correspond to asset purchases, mortgage payments, bill payments, rent payments, goods purchases, service payments, rents received, wages earned, received service payments, payments received via sold goods and/or services, and the like.

In various examples, the computing system 100 can access the client's individualized action plan 350 and personal balance sheet 300 in response to receiving each financial update (435). Based on the financial update, the computing system 100 can execute the summary logic to update the personalized balance sheet 300 (440). The computing system 100 can further execute the optimization logic using the financial update information and current action plan to generate an updated action plan 350 for the client 190 (445). In doing so, the computing system 100 can respond to the nature of the particular financial update trigger (e.g., whether the financial update indicates a spent sum, a received paycheck, bill payment, etc.) to provide the client 190 with an updated set of action prioritizations, as described herein.

Furthermore, the computing system 100 can monitor user gestures performed on the interactive user interface 242, such as selections, swipes, and inputs to determine a corresponding display action for the user interface 242. Thus, in response to these display triggers performed by the client 190, the computing system 100 can transmit content data to the client's computing device 185 to cause the customized, interactive user interface 242 to be displayed (450). Accordingly, in response to a first user selection, the computing system 100 can cause the client device 185 to present the updated personalized balance sheet 300 (452), and in response to a second user selection, the computing system 100 can cause the client device 185 to display the updated individualized action plan 350 (454). It is contemplated that since the interactive user interface 242 that presents the personalized balance sheet 300 and individualized action plan 350 are custom-generated and dynamically updated automatically for the client 190 through execution of summary and optimization logic, as described herein, the combined processes described with respect to FIGS. 4A and 4B provide a technical improvement to existing technology in the field of personal financial management.

Hardware Diagram

Figure 5:
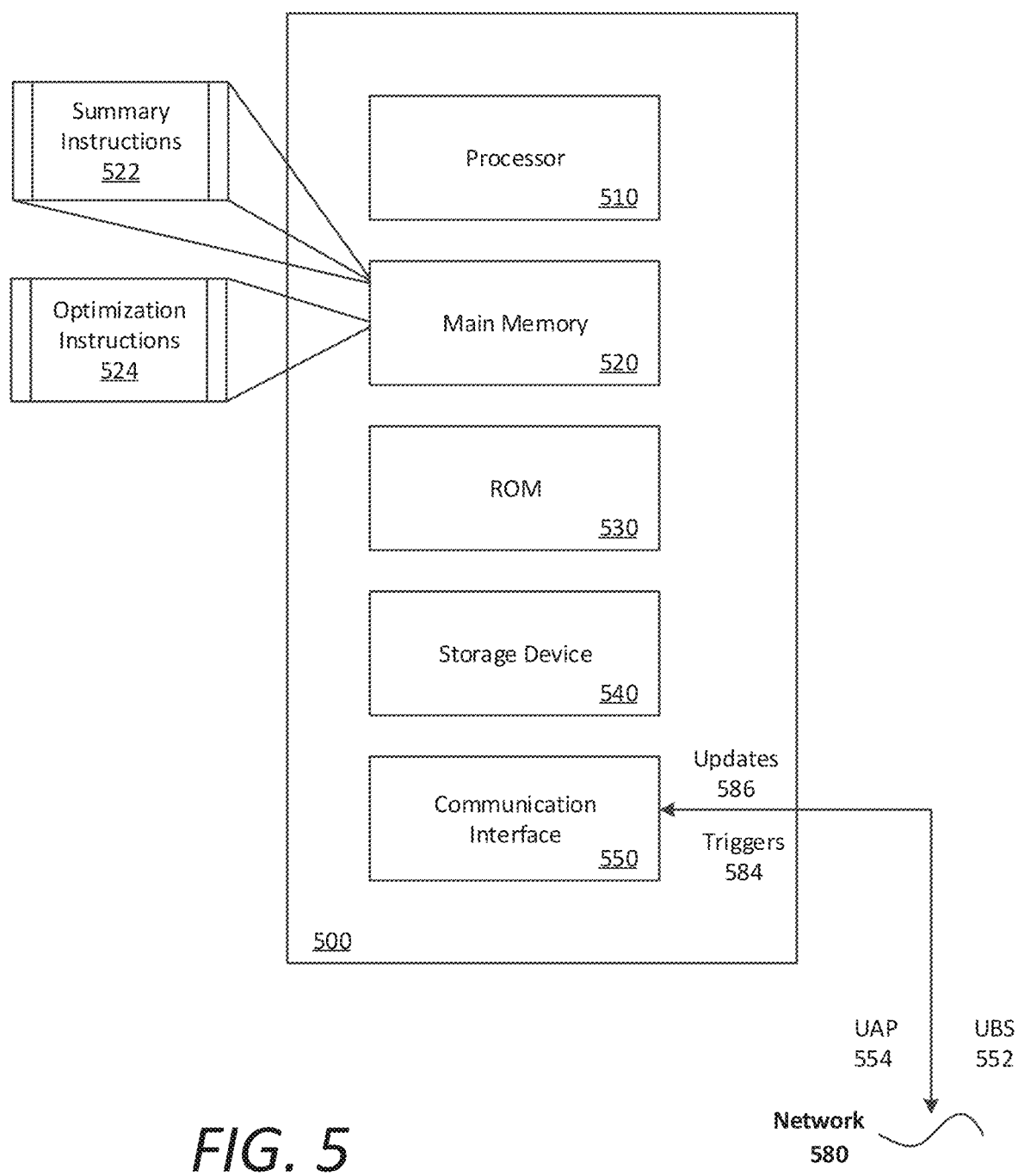
FIG. 5 is a hardware diagram illustrating a computer system upon which examples described herein may be implemented.

FIG. 5 is a hardware diagram illustrating a computer system 500 upon which examples described herein may be implemented. A computer system 500 can be implemented on, for example, a server or combination of servers. For example, the computer system 500 may be implemented as part of a network service for providing transaction services. In the context of FIGS. 1 and 2, the computing system 100, 240 may be implemented using one or more computer systems 500 such as described by FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random-access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate over one or more networks 580 (e.g., cellular or Wi-Fi network) through use of the network link (wireless or wired). Using the network link, the computer system 500 can communicate with one or more computing devices, one or more servers, and/or client transaction terminals. The executable instructions in the memory 520 can include summary instructions 522, which the computer system 500 can execute to receive real-time client financial information and updates 586 and generate an updated personalized balance sheet 552, as described herein. The executable instructions stored in memory 520 can also include optimization instructions 524, which the computer system 500 can execute to receive client financial information and updates 586 and generate an updated and individualized action plan 554 for the client, as provided herein. In response to receiving user interface triggers 584 corresponding to the client 190 interacting with the user interface, the computer system 500 can transmit content data to enable the client 190 to view each of the balance sheet 552 and the action plan 554.

The processor 510 is configured with software and/or other logic to perform one or more processes, steps and other functions described with implementations, such as described with respect to FIGS. 1-4, and elsewhere in the present application. Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A computing system comprising:
a network communication interface communicating, over one or more networks, with a computing device of a user of a financial assistance server;
one or more processors; and
a memory storing instructions that cause the computing system to:
receive, over the one or more networks, user financial data of a user of a financial assistance service;
generate, using the user financial data, a personalized balance sheet and an individualized action plan for the user, the individualized action plan providing a set of priorities for the user;
detect, in real time, by communicating, over the one or more networks, with a data source for a financial account of the user, financial update data indicating a change to a financial situation of the user;
in response to receiving the financial update data, update, in real-time, each the personalized balance sheet and the individualized action plan for the user based on the detected change, the updated individualized action plan indicating a set of actions for the user to perform based on the set of priorities; and
transmit, over the one or more networks, content data to a computing device of the user, the content data enabling the user to view and interact with the updated personalized balance sheet and the updated individualized action plan on an interactive user interface, the content data including a selectable link to a resource for enabling the user to perform at least one action of the set of actions in accordance with the set of priorities of the updated individualized action plan.

2. The computing system of claim 1, wherein the user financial data indicates assets and liabilities of the user, the assets and liabilities indicating asset account balances and debt balances of the user.

3. The computing system of claim 2, wherein the user financial data further indicates an income of the user.

4. The computing system of claim 1, wherein the changes to the financial situation of the user include received income, one or more purchases, or one or more payments made by the user.

5. The computing system of claim 4, wherein the executed instructions cause the computing system to execute optimization logic using the financial update data of the user to dynamically update the individualized action plan as the changes to the financial situation of the user are detected.

6. The computing system of claim 1, wherein the individualized action plan for the user indicates the set of priorities to be performed by the user in order to achieve a set of milestones that correspond to a set of action plan goals.

7. The computing system of claim 6, wherein the individualized action plan includes a progress indicator for each milestone in the set of milestones.

8. A non-transitory computer readable medium storing instructions that, when executed by one or more processors of a computing system, cause the computing system to:
communicate, over one or more networks, with a computing device of a user of a financial assistance server;
receive, over the one or more networks, user financial data of a user of a financial assistance service;
generate, using the user financial data, a personalized balance sheet and an individualized action plan for the user, the individualized action plan providing a set of priorities for the user;
detect, in real time by communicating, over the one or more networks, with a data source for a financial account of the user, financial update data indicating a change to a financial situation of the user;
in response to receiving the financial update data, update, in real-time, each of the personalized balance sheet and the individualized action plan for the user based on the detected change, the updated individualized action plan indicating a set of actions for the user to perform based on the set of priorities; and
transmit, over the one or more networks, content data to a computing device of the user, the content data enabling the user to view and interact with the updated personalized balance sheet and the updated individualized action plan on an interactive user interface, the content data including a selectable link to a resource for enabling the user to perform at least one action of the set of actions in accordance with the set of priorities of the updated individualized action plan.

9. The non-transitory computer readable medium of claim 8, wherein the user financial data indicates assets and liabilities of the user, the assets and liabilities indicating asset account balances and debt balances of the user.

10. The non-transitory computer readable medium of claim 9, wherein the user financial data further indicates an income of the user.

11. The non-transitory computer readable medium of claim 8, wherein the changes to the financial situation of the user include received income, one or more purchases, or one or more payments made by the user.

12. The non-transitory computer readable medium of claim 11, wherein the executed instructions cause the computing system to execute optimization logic using the financial update data of the user to dynamically update the individualized action plan as the changes to the financial situation of the user are detected.

13. The non-transitory computer readable medium of claim 8, wherein the individualized action plan for the user indicates a set of prioritizations to be performed by the user in order to achieve a set of milestones that correspond to a set of action plan goals.

14. The non-transitory computer readable medium of claim 13, wherein the individualized action plan includes a progress indicator for each milestone in the set of milestones.

15. A computer-implemented method of assisting users of a financial assistance service, the method being performed by one or more processors and comprising:

communicating, over one or more networks, with;

receiving, over the one or more networks, user financial data of a user of a financial assistance service;

generating, using the user financial data, a personalized balance sheet and an individualized action plan for the user, the individualized action plan providing a set of priorities for the user;

detecting, in real time by communicating, over the one or more networks, with a data source for a financial account of the user, financial update data indicating a change to a financial situation of the user;

in response to receiving the financial update data, updating, in real-time, each of the personalized balance sheet and the individualized action plan for the user based on the detected change, the updated individualized action plan indicating a set of actions for the user to perform based on the set of priorities; and transmitting, over the one or more networks, content data to a computing device of the user, the content data enabling the user to view and interact with at least one of the updated personalized balance sheet and the updated individualized action plan on an interactive user interface, the content data including a selectable link to a resource for enabling the user to perform at least one action of the set of actions in accordance with the set of priorities of the updated individualized action plan.

16. The method of claim 15, wherein the user financial data indicates assets and liabilities of the user, the assets and liabilities indicating asset account balances and debt balances of the user.

17. The method of claim 16, wherein the user financial data further indicates an income of the user.

18. The method of claim 15, wherein the changes to the financial situation of the user include received income, one or more purchases, or one or more payments made by the user.

19. The method of claim 18, wherein the one or more processors execute optimization logic using the financial update data of the user to dynamically update the individualized action plan as the changes to the financial situation of the user are detected.

20. The method of claim 15, wherein the individualized action plan for the user indicates a set of prioritizations to be performed by the user in order to achieve a set of milestones that correspond to a set of action plan goals.

* * * * *